US007389949B2

(12) United States Patent
Marchand et al.

(10) Patent No.: US 7,389,949 B2
(45) Date of Patent: Jun. 24, 2008

(54) PRESSURE WASHER TRIGGER LOCK

(75) Inventors: Gregory Marchand, Waukesha, WI (US); Richard J. Gilpatrick, Whitewater, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 92 days.

(21) Appl. No.: 11/295,237

(22) Filed: Dec. 6, 2005

(65) Prior Publication Data

US 2006/0131151 A1 Jun. 22, 2006

Related U.S. Application Data

(60) Provisional application No. 60/635,865, filed on Dec. 14, 2004.

(51) Int. Cl.
*B05B 9/01* (2006.01)
*F16K 35/00* (2006.01)

(52) U.S. Cl. ........................ 239/526; 239/525; 251/101; 251/102; 251/110

(58) Field of Classification Search ................. 239/526, 239/525, 530, 532, 329, 332, 333, 569; 251/101, 251/102, 110; 222/153.01, 153.12, 153.14
See application file for complete search history.

(56) References Cited

U.S. PATENT DOCUMENTS

| | | | | |
|---|---|---|---|---|
| 3,888,421 | A * | 6/1975 | Chow | 239/456 |
| 4,083,497 | A | 4/1978 | Rosenberger | |
| 4,166,579 | A | 9/1979 | Beise et al. | |
| 4,216,911 | A | 8/1980 | Huperz et al. | |
| 4,225,087 | A | 9/1980 | Lawlor | |
| 4,245,759 | A | 1/1981 | Baker et al. | |
| 4,389,017 | A | 6/1983 | Geberth, Jr. | |
| 4,676,437 | A | 6/1987 | Brown | |
| 4,709,859 | A | 12/1987 | Schulze et al. | |
| 4,880,166 | A * | 11/1989 | Suttner | 239/526 |
| 4,925,107 | A | 5/1990 | Brown | |

(Continued)

FOREIGN PATENT DOCUMENTS

DE 3214180 A1 10/1983

(Continued)

OTHER PUBLICATIONS

Skilsaw Sold by Skil Corp.; at least as early as Nov. 2005; 8 pages including 31 photos.

*Primary Examiner*—Darren W Gorman
(74) *Attorney, Agent, or Firm*—Michael Best & Friedrich LLP

(57) ABSTRACT

A pressure washer wand is connectable to a source of fluid. The pressure washer wand includes a housing that defines an interior and a flow path disposed substantially within the interior. The flow path includes an inlet in fluid communication with the source and an outlet. A valve at least partially defines a portion of the flow path and is movable between a closed position and an open position in which fluid travels from the inlet to the outlet. A user interface is movable between an actuated position in which the valve is open and a non-actuated position in which the valve is closed. A lock member is substantially disposed within the interior and is movable between a locked position in which the lock assembly inhibits movement of the user interface, and an unlocked position.

15 Claims, 19 Drawing Sheets

U.S. PATENT DOCUMENTS

| | | | |
|---|---|---|---|
| 5,143,299 | A | 9/1992 | Simonetti et al. |
| 5,160,092 | A | 11/1992 | Rose et al. |
| 5,176,327 | A * | 1/1993 | Petersen et al. ............. 239/526 |
| 5,199,642 | A | 4/1993 | Rankin |
| 5,462,204 | A | 10/1995 | Finn |
| 5,636,789 | A | 6/1997 | Shook |
| 5,735,849 | A | 4/1998 | Baden et al. |
| 5,775,432 | A | 7/1998 | Burns et al. |
| 5,791,564 | A * | 8/1998 | Carra ......................... 239/526 |
| 5,887,761 | A | 3/1999 | Foster et al. |
| 5,924,599 | A | 7/1999 | Brown |
| 5,975,429 | A | 11/1999 | Jezek |
| 6,079,639 | A * | 6/2000 | Barbato ...................... 239/525 |
| 6,158,624 | A | 12/2000 | Grigg et al. |
| 6,260,774 | B1 | 7/2001 | Erickson |
| 6,286,723 | B1 * | 9/2001 | Sweeton et al. ........ 222/153.13 |
| 6,305,619 | B1 | 10/2001 | Thurn |
| 6,431,468 | B1 | 8/2002 | Brown et al. |
| 6,460,787 | B1 | 10/2002 | Hartle et al. |
| 6,651,910 | B2 | 11/2003 | Elliott-Moore |
| 6,663,307 | B2 | 12/2003 | Kopanic et al. |
| 6,669,061 | B2 | 12/2003 | Tada |
| 6,695,225 | B2 | 2/2004 | Yanagida |
| 6,708,901 | B2 | 3/2004 | Hubmann et al. |
| 2002/0008164 | A1 | 1/2002 | Yanagida |
| 2002/0092925 | A1 | 7/2002 | Hubmann et al. |
| 2002/0190139 | A1 | 12/2002 | Morrison |
| 2003/0006322 | A1 | 1/2003 | Hartle et al. |
| 2003/0052204 | A1 | 3/2003 | Aberegg et al. |
| 2003/0094512 | A1 | 5/2003 | Elliott-Moore |
| 2003/0116647 | A1 | 6/2003 | Brown |
| 2004/0112984 | A1 | 6/2004 | Hubmann et al. |
| 2004/0144855 | A1 | 7/2004 | Herhold |
| 2004/0155119 | A1 | 8/2004 | Hubmann et al. |

FOREIGN PATENT DOCUMENTS

| | | | |
|---|---|---|---|
| DE | 29505406 | U1 | 7/1995 |
| DE | 29816208 | U1 | 10/1998 |
| EP | 0715827 | A | 6/1996 |
| EP | 0773071 | A | 5/1997 |

* cited by examiner

PRESSURE WASHER TRIGGER LOCK

RELATED APPLICATION DATA

This application claims the benefit under 35 U.S.C. § 119 of U.S. Provisional Application No. 60/635,865, entitled PRESSURE WASHER TRIGGER LOCK, filed on Dec. 14, 2004.

BACKGROUND

The present invention relates to a pressure washer system that includes a trigger-actuated gun. More particularly, the present invention relates to a trigger-actuated gun that includes a lock mechanism that reduces unwanted actuations of the trigger.

Pressure washers use high-pressure liquid, typically water, to clean surfaces such as driveways, decks, walls, and the like. Generally, the pressure washer includes a pump that operates to provide the high-pressure fluid through an output hose or passageway. A gun is in fluid communication with the pump and the passageway and includes a trigger mechanism that is actuated by the user to discharge the high-pressure fluid. Generally, the user squeezes the trigger with one hand and supports the discharge end of the gun with the other hand during use.

SUMMARY

The invention provides a trigger lock for the trigger of a gun that is used with a pressure washer system. The trigger lock is biased to a locked position in which the trigger is inhibited from actuation. In some constructions, the lock is disposed behind the trigger, while other constructions position the lock in front of the trigger.

The invention also provides a pressure washer wand connectable to a source of fluid. The pressure washer wand includes a housing that defines an interior, and a flow path disposed substantially within the interior and including an inlet in fluid communication with the source and an outlet. A valve at least partially defines a portion of the flow path and is movable between a closed position and an open position in which fluid travels from the inlet to the outlet. A user interface is movable between an actuated position in which the valve is open, and a non-actuated position in which the valve is closed. A lock member is substantially disposed within the interior and is movable in a substantially linear manner between a locked position in which the lock assembly inhibits movement of the user interface to the actuated position, and an unlocked position.

The invention further provides a pressure washer wand that is connectable to a source of fluid. The pressure washer wand includes a housing that defines an interior, and a flow path disposed substantially within the interior and including an inlet in fluid communication with both the source and an outlet. A valve at least partially defines a portion of the flow path and is movable between a closed position and an open position in which fluid travels from the inlet to the outlet. A user interface is movable between an actuated position in which the valve is open, and a non-actuated position in which the valve is closed. A lock member is movable in a first direction from a locked position to a first unlocked position, and is movable in a second direction opposite the first direction from the locked position to a second unlocked position. The lock member inhibits movement of the user interface to the actuated position when in either the first locked position or the second locked position.

The invention also provides a pressure washer wand that is connectable to a source of fluid. The pressure washer wand includes a housing that defines a guard having a front portion and a rear portion. A flow path is disposed substantially within the housing and includes an inlet in fluid communication with both the source and an outlet. A valve at least partially defines a portion of the flow path and is movable between a closed position and an open position in which fluid travels from the inlet to the outlet. A user interface is movable between an actuated position in which the valve is open, and a non-actuated position in which the valve is closed. The user interface is movable toward the rear portion when moving toward the actuated position. A lock member is substantially disposed between the user interface and the rear portion, and is movable from a locked position toward the user interface to an unlocked position. When in the locked position, the lock assembly inhibits movement of the user interface to the actuated position.

The invention further provides a method of operating a pressure washer wand defining a first side, a second side, a user interface, an inlet, an outlet, and a locking assembly. The method includes providing a flow of fluid to the inlet, inhibiting flow from the inlet to the outlet, and moving the user interface from a non-actuated position toward an actuated position. The method also includes inhibiting movement of the user interface to the actuated position, moving the lock assembly from a locked position to an unlocked position that allows movement of the user interface to the actuated position to allow flow from the inlet to the outlet, and releasing the user interface. The method further includes biasing the user interface to the non-actuated position and the lock assembly to the locked position.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

Figure 1:
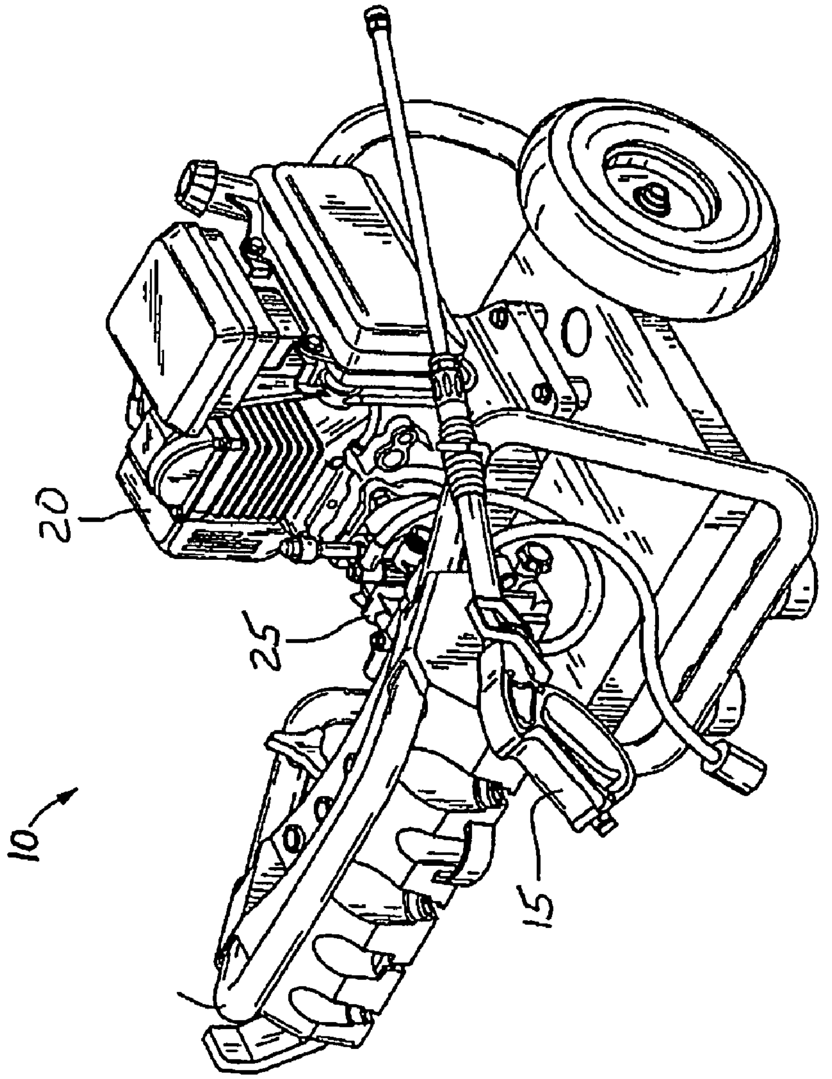
FIG. 1 is a perspective view of a pressure washer including a gun.

FIG. 1 illustrates a pressure washer 10 that includes a trigger-actuated gun 15. The illustrated pressure washer 10 is a mobile pressure washer that is preferably powered by an internal combustion engine 20, although it could be electrically-powered. The engine 20 drives a pump 25 which draws fluid, typically water, from a source (e.g., an onboard reservoir, a residential garden hose, etc.) and delivers the fluid to an output hose or passageway. The passageway is further connected to the gun 15 and any fluid path between the pump 25 and the gun 15 contains a volume of entrained fluid that remains in the fluid path until released.

FIG. 1 illustrates one possible pressure washer 10 that employs the invention. As one of ordinary skill will realize, the invention described herein is suitable for use with virtually any pressure washer. As such, the invention should not be limited only to pressure washers 10 similar to the one illustrated in FIG. 1.

Figure 2:
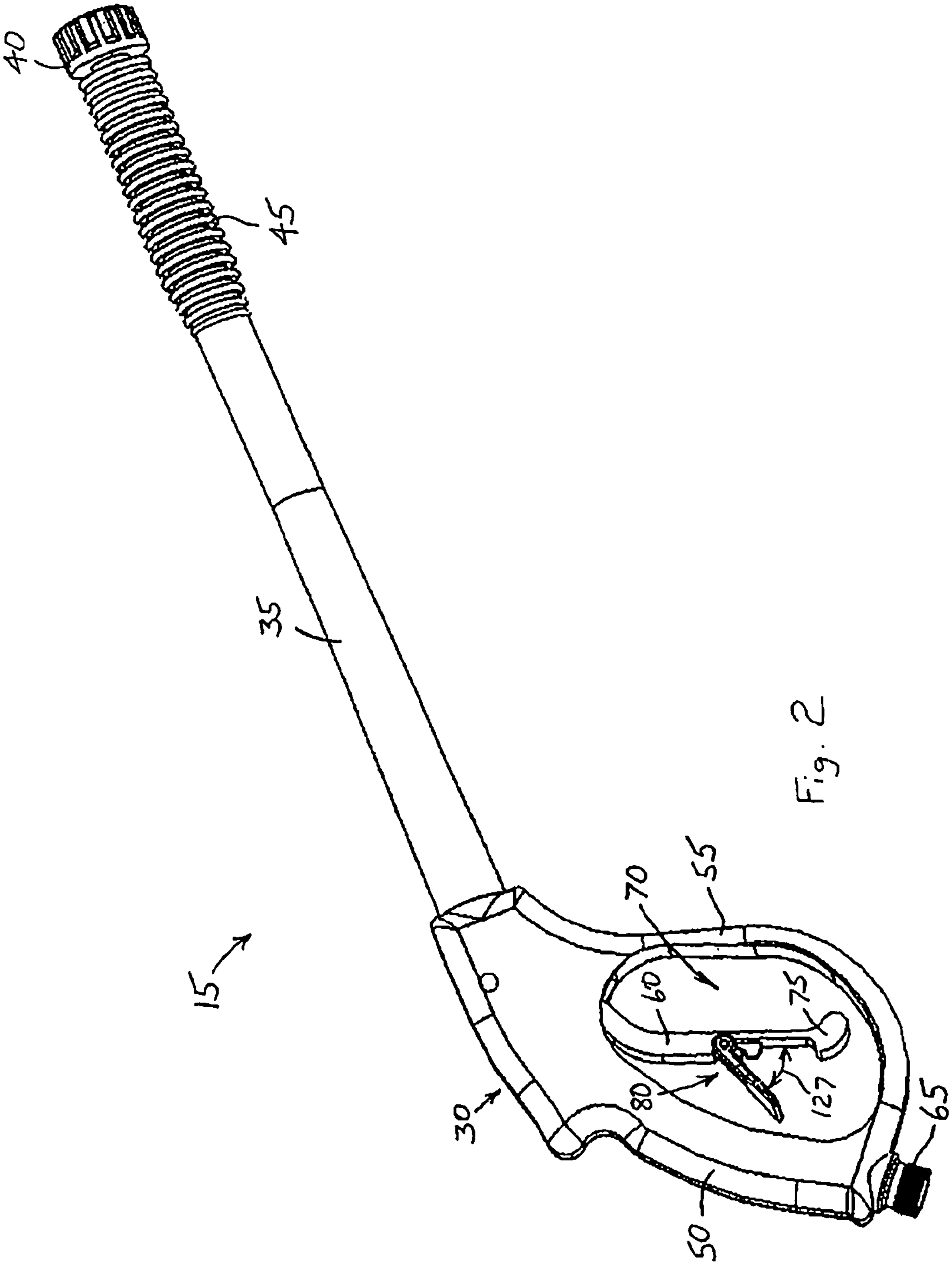
FIG. 2 is a perspective view of the gun of FIG. 1 including a handle portion.

As illustrated in FIG. 2, the gun 15 includes a handle portion 30, a tubular gun portion 35, and a wand attachment portion 40. The wand attachment portion 40 is adapted to receive a nozzle or a wand 41 (shown in FIG. 1) that supports the nozzle (not shown). The wand 41 extends the discharge of the nozzle to a point that is spaced farther from the handle portion 30, and may include a quick-connect type fitting to allow the user to quickly and easily switch nozzles. Several nozzles are available to shape the spray pattern as it is being discharged from the gun 15 or wand 41. For example, one nozzle may produce a fan-shaped spray pattern that spreads at a 60-degree angle, while another nozzle may produce a fan-shaped spray pattern that spreads at a 30-degree angle. The user can choose the nozzle desired, depending on the particular application.

The gun portion 35 extends between the handle portion 30 and the wand attachment portion 40 and may include a handgrip 45. Generally, the gun portion 35 is simply a tube that directs the fluid from the handle portion 30 to the wand attachment portion 40. The handgrip 45, if employed, is typically a thermally insulative material (e.g., rubber, plastic, etc.) that at least somewhat insulates the user's hand from the gun portion 35.

The handle portion 30 includes a body 50, a guard 55, and a trigger assembly 60. The body 50 includes a fluid inlet 65 that receives the high-pressure fluid from the pump 25 via the passageway. A flow path disposed within the body 50 guides the fluid from the inlet 65 to a valve 267 (shown in FIGS. 8-9) that is disposed within the body 50 and is interconnected with the trigger assembly 60. The valve is moved from a closed position to an open position as the user actuates the trigger assembly 60. When in the open position, the valve allows the fluid to flow into the gun portion 35 and out the nozzle. When the valve is closed, the fluid is trapped between the valve and the passageway or the pump 25. Valves of this type are well known in the art of pressure washers and need not be described in detail. Also, there are many other valve configurations that may be used, but are not shown.

The guard 55 extends from the body 50 and defines a trigger space 70. The trigger assembly 60 is substantially disposed within this trigger space 70. The guard 55 protects the user's hand and the trigger assembly 60 from impacts that may occur during use. In addition, the guard 55 makes it more difficult to inadvertently actuate the trigger assembly 60.

With continued reference to FIG. 2, the trigger assembly 60 includes a user interface or trigger 75 that extends from the body 50, and a trigger lock assembly 80 coupled to the trigger 75. The trigger 75 is pivotally attached to the body 50 such that it can be moved between actuated and non-actuated positions. Generally, the trigger 75 is biased to the non-actuated position using biasing mechanisms that are well known in the art (e.g., fluid pressure, springs, etc.). As the trigger 75 moves from the non-actuated position to the actuated position, the valve within the body 55 is actuated to initiate the flow of fluid.

Figure 3:
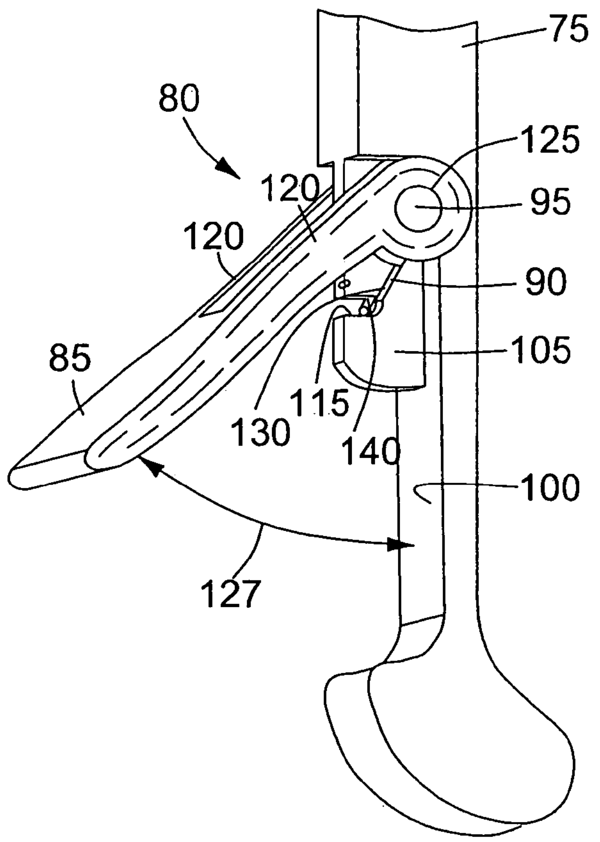
FIG. 3 is a perspective view of a trigger assembly of the handle portion of FIG. 2 including a spring.
Figure 3A:
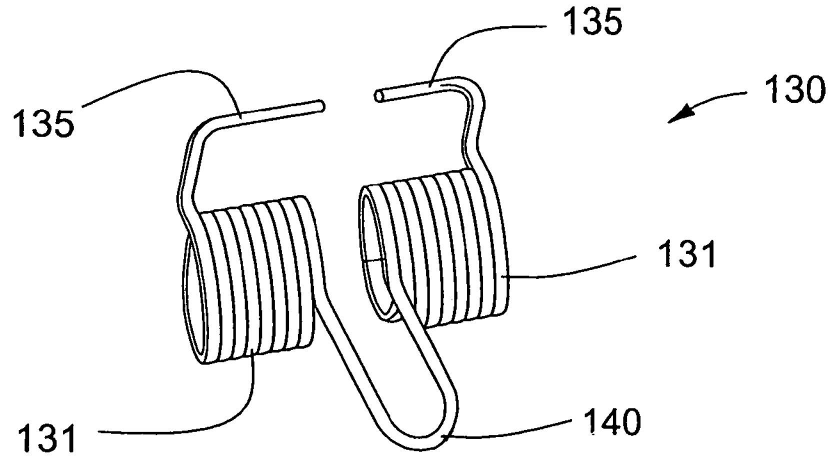
FIG. 3*a* is a perspective view of the spring of FIG. 3.
Figure 4:
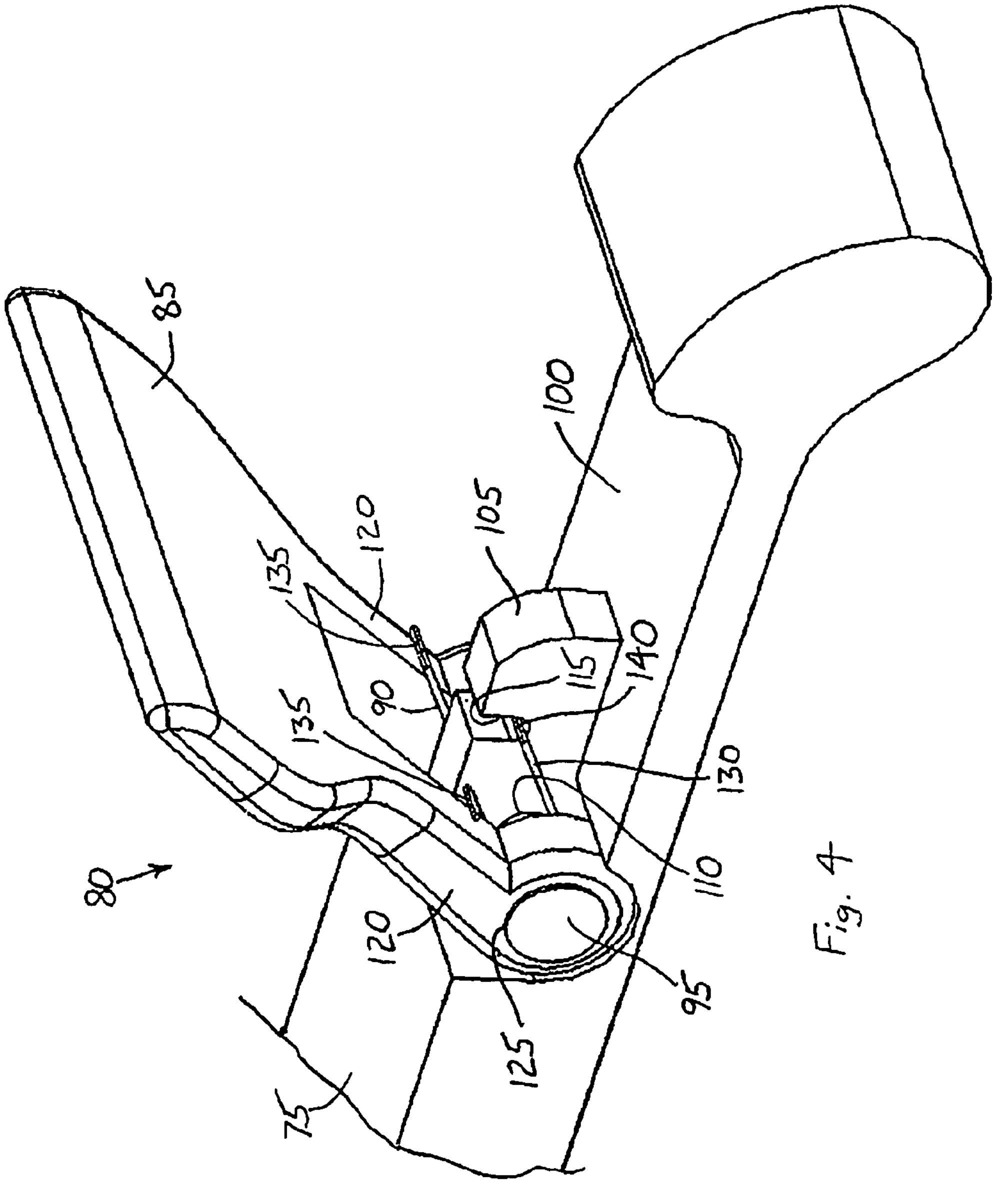
FIG. 4 is another perspective view of the trigger assembly of FIG. 3.

Turning to FIGS. 3 and 4, the trigger lock assembly 80 is illustrated in a locked position. The trigger lock assembly 80 attaches to the trigger 75 and includes a lever 85, a biasing member 90, and a pin 95. The trigger 75 is formed to include a lever recess 100 that receives the lever 85 when the trigger lock assembly 80 is in an unlocked position. A boss 105 extends into the lever recess 100 and defines a pin aperture 110 (partially visible in FIG. 4) and a biasing member slot 115.

The lever 85 includes two arms 120 that define pin-receiving apertures 125. The arms 120 are spaced apart from one another such that when the trigger lock assembly 80 is in the unlocked position, the boss 105 fits between the arms 120. The pin 95 extends through the pin-receiving apertures 125, and the pin aperture 110 to pivotally attach the lever 85 to the boss 105. In the illustrated construction, the ends of the pin 95 are deformed (e.g., peened, mushroomed, etc.) to fixedly attach the pin 95, the lever 85, and the boss 105. Of course other construction may use other attachment means (e.g., threaded pin, fasteners, washers, cotter pins, adhesive, press fit, etc.) if desired.

The lever 85 extends from the trigger 75 to define an angle 127. While FIGS. 2-4 illustrate one possible angle, other angles are possible. For example, a larger angle (e.g., 90 degrees) could be employed to reduce the space between the lever 85 and the body 50 when the trigger 75 is in the non-actuated position.

With continued reference to FIGS. 3 and 4, the biasing member 90 is illustrated as including a torsional spring 130. The torsional spring 130 includes two coil portions 131, two leg portions 135, and a U-shaped portion 140. The coil portions are positioned around the pin 95 between the boss 105 and the arms 120 of the lever 85. The U-shaped portion 140 extends from the coil portions and engages the biasing member slot 115. Each of the legs 135 extends from one side of the boss 105 and engages one of the arms 120 of the lever 85. With the biasing member 90 positioned as described, the lever 85 is biased toward the locked position, as illustrated in FIGS. 2-4. While a torsional spring 130 having two coil portions has been described as the biasing member 90, other types of biasing members 90 are also contemplated. For example, a torsional spring having a single coil, a compression spring, or a leaf spring could be employed as a biasing member 90 if desired.

In operation, the user starts the engine 20 to begin operation of the pump 25. The pump 25 draws low-pressure fluid from the source, increases the pressure of the fluid, and delivers the fluid to the passageway. The user grasps the gun 15 and aims it at the surface to be cleaned. The user then pulls the trigger 75 toward the body 50 to open the valve and initiate the flow of high-pressure fluid out of the nozzle. However, the trigger lock assembly 80, which is biased into the locked position, extends rearward toward the body 50 and engages the body 50 before the trigger 75 can move a sufficient distance to open the valve. Thus, the user is unable to open the valve without first moving the trigger lock assembly to the unlocked position. To move the trigger lock assembly 80, the user must move and maintain the lever 85 in the unlocked position until the trigger 75 is moved to the actuated position. Once the trigger 75 is in the actuated position, the body 50 maintains the trigger lock assembly 80 in the unlocked position. When the user releases the trigger 75, the trigger assembly 60 is returned to the non-actuated position as is known in the art. The biasing member 90 then biases the trigger lock assembly 60 back to the locked position.

Figure 5:
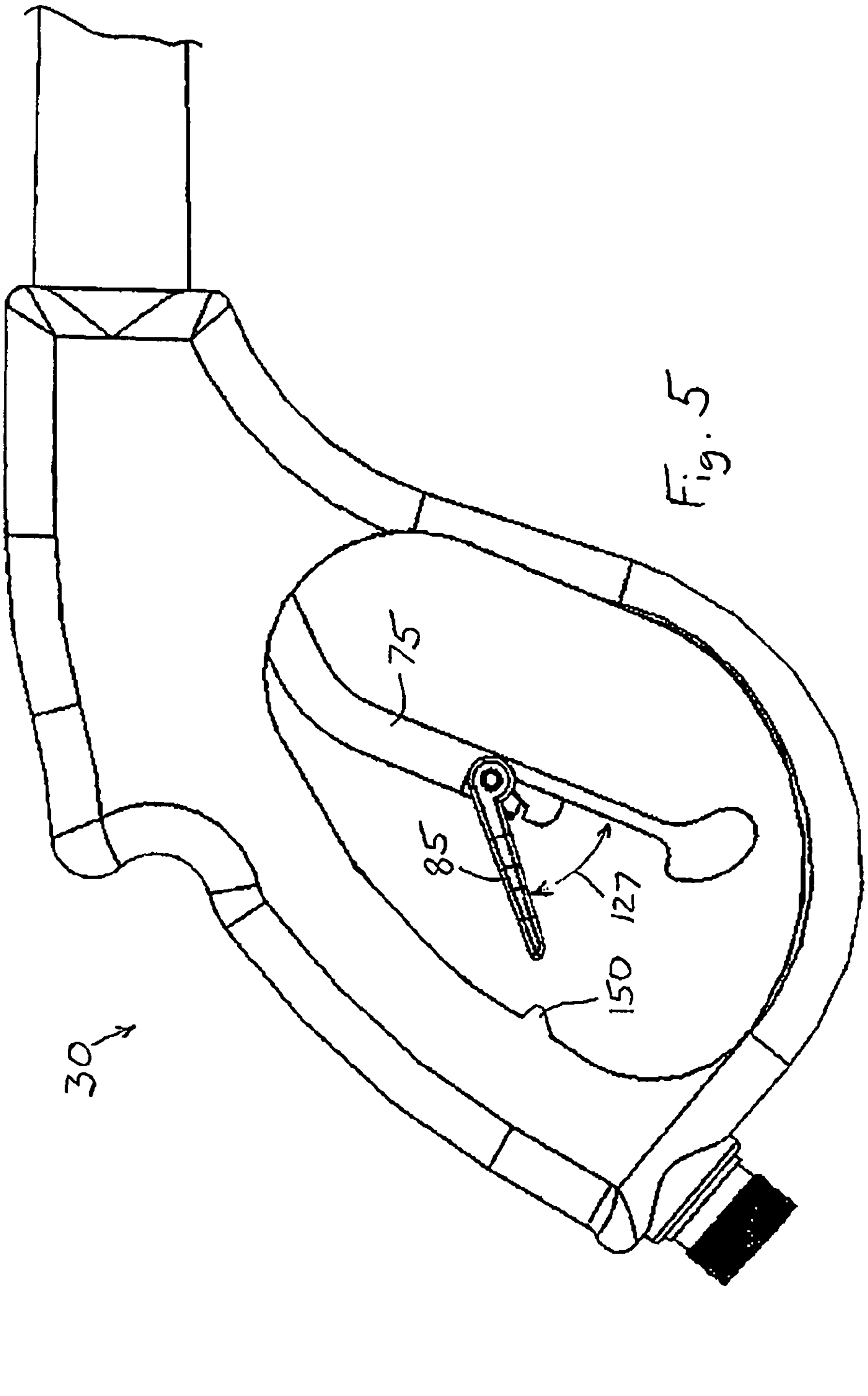
FIG. 5 is a side view of a handle portion including a ledge.

FIG. 5 illustrates another construction in which a notch or ledge 150 is formed as part of, or attached to, the body 50. The ledge 150 is positioned such that the lever 85 engages the ledge 150 as the trigger 75 is moved from the non-actuated position toward the actuated position to inhibit further movement of the trigger 75.

As illustrated in FIGS. 3 and 4, the lever recess 100 is contoured to substantially match the contour of the lever 85. This gives the gun 15 a "clean" look when the lever 85 is moved to the unlocked position. Other constructions may employ a simpler lever recess 100 and/or lever contour to reduce the cost and/or complexity of the components.

Figure 6:
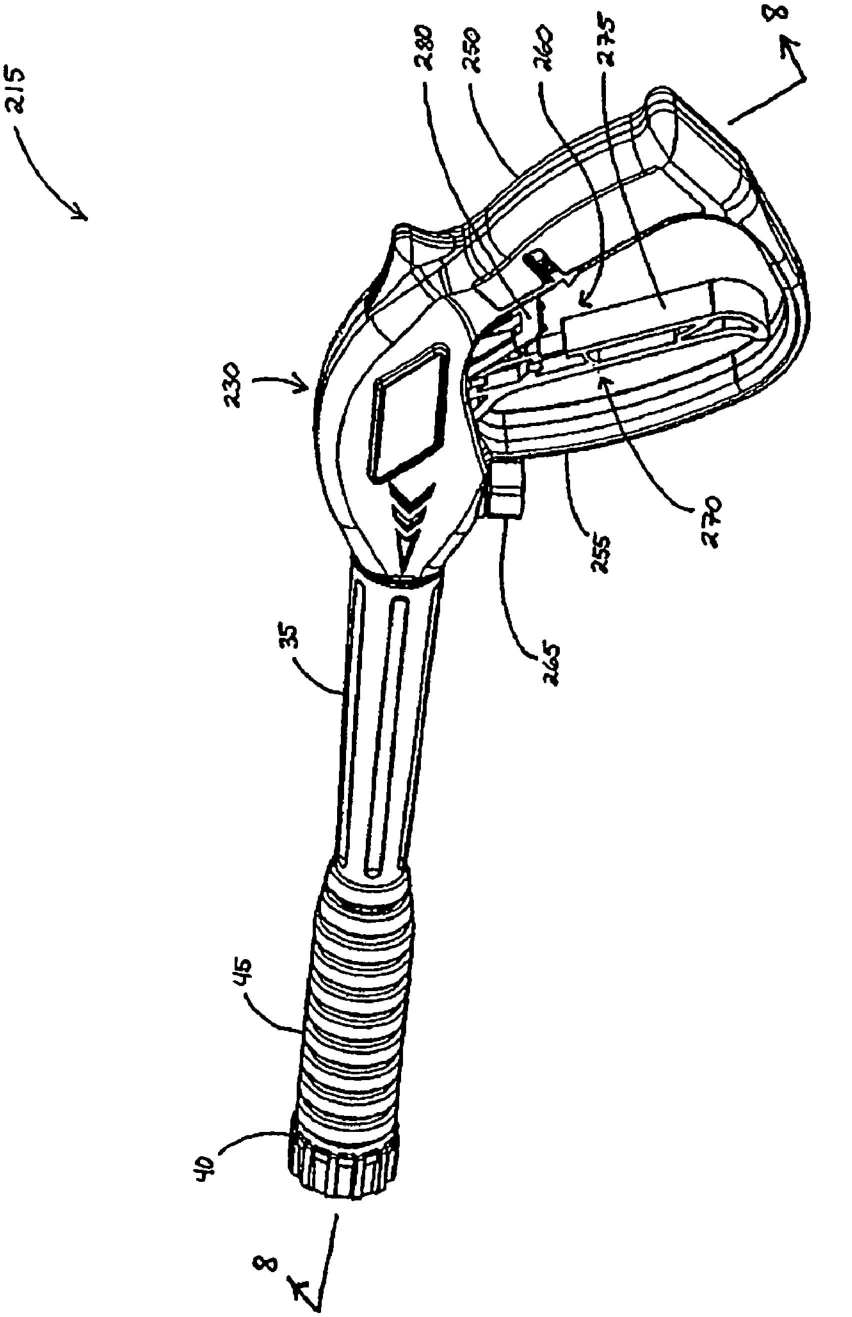
FIG. 6 is a perspective view of another embodiment of a gun including a handle portion.

FIGS. 6-13 illustrate another construction of a trigger actuated gun 215. Referring specifically to FIG. 6, the gun 215 includes the gun portion 35, the wand attachment portion 40, the handgrip 45, and a handle portion 230. The gun portion 35, the wand attachment portion 40, and the handgrip 45 have been previously described with regard to FIGS. 1-5 and will not be discussed in further detail.

With continued reference to FIG. 6, the handle portion 230 includes a body 250, a guard 255, and a trigger assembly 260. The body 250 is generally formed from two pieces coupled together to define a hollow portion. The body 250 supports a fluid inlet 265 that receives the fluid from the passageway. The body 250 may be made of a plastic material or other suitable material. The body 250 supports a flow path similar to the flow path described with regard to FIGS. 1-5 and is interconnected with the trigger assembly 260. The flow path 265 includes a valve 267 (see FIGS. 8-9) supported within the body 250 that is movable between an open and a closed position.

The guard 255 extends from the body 250 and defines a trigger space 270. The guard 255 is similar to the guard 55 in FIGS. 1-5 and will not be discussed in greater detail. The trigger assembly 260 is substantially disposed within the trigger space 270 and includes a trigger 275 that extends from the body 250 and a trigger lock assembly 280 coupled to the trigger 275.

Figure 7:
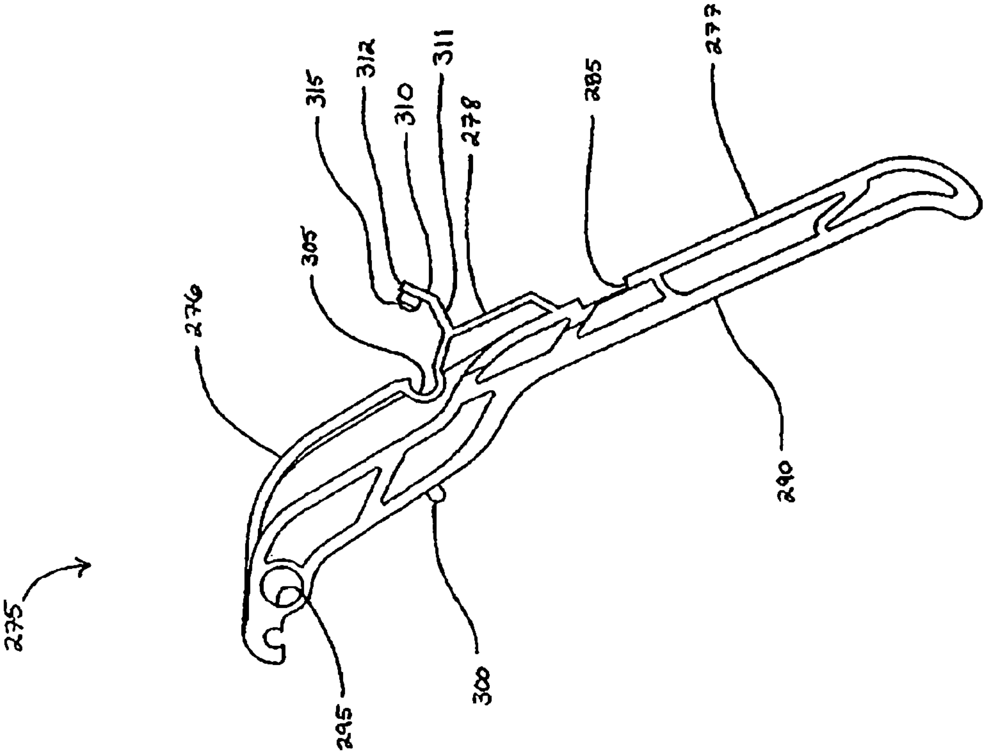
FIG. 7 is a side view of a trigger of the gun of FIG. 6.

As shown in FIG. 7, the trigger 275 includes an upper portion 276, a lower portion 277 including a lever recess 285 and a user grip 290, and a raised portion 278. The upper portion 276 includes a bore 295, a stop member 300, and an aperture 305. The bore 295 defines a cylindrical aperture that facilitates pivotal attachment of the trigger 275 to the body 250. The bore 295 may be formed as part of the trigger 275 or may be formed separately (e.g., drilled) during the manufacturing process. In some constructions, a sleeve or other component (e.g., a bearing, a bushing, etc.) is inserted into the trigger 275 to provide reduced friction, wear resistance, and/or additional strength. The stop member 300 is a cylindrical protrusion that extends from the upper portion 276. When the trigger 275 is in the non-actuated position, the stop member 300 contacts the guard 255 to limit further movement of the trigger 275. The aperture 305 is substantially cylindrical to facilitate pivotal attachment of the trigger lock assembly 280. In preferred constructions, the aperture 305 includes an open portion that facilitates attachment of the trigger lock assembly 280 to the trigger 275.

Still referring to FIG. 7, the raised portion 278 includes a biasing arm 310. The biasing arm 310 includes a first portion 311 that extends from the trigger 275 and a second portion 312 that supports a knob 315. In the illustrated construction, the first portion 311 of the biasing arm 310 extends substantially normal to the trigger 275 and the second portion 312 extends from the first portion 311. Of course, other arrangements of the biasing arm 310 are possible.

Figure 8:
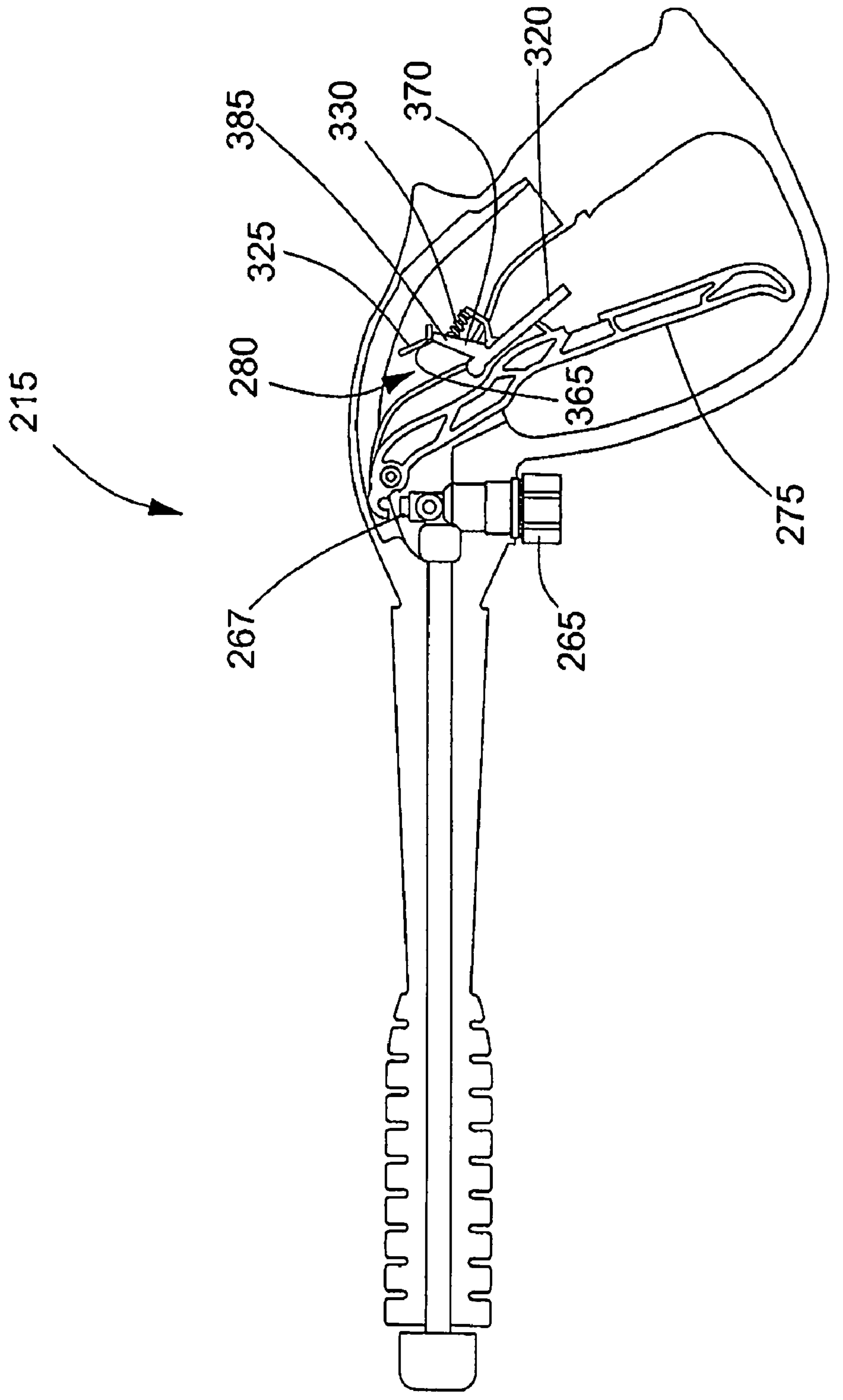
FIG. 8 is a section view of the gun of FIG. 6 taken along line 8-8 of FIG. 6 including a trigger assembly in a locked position.
Figure 9:
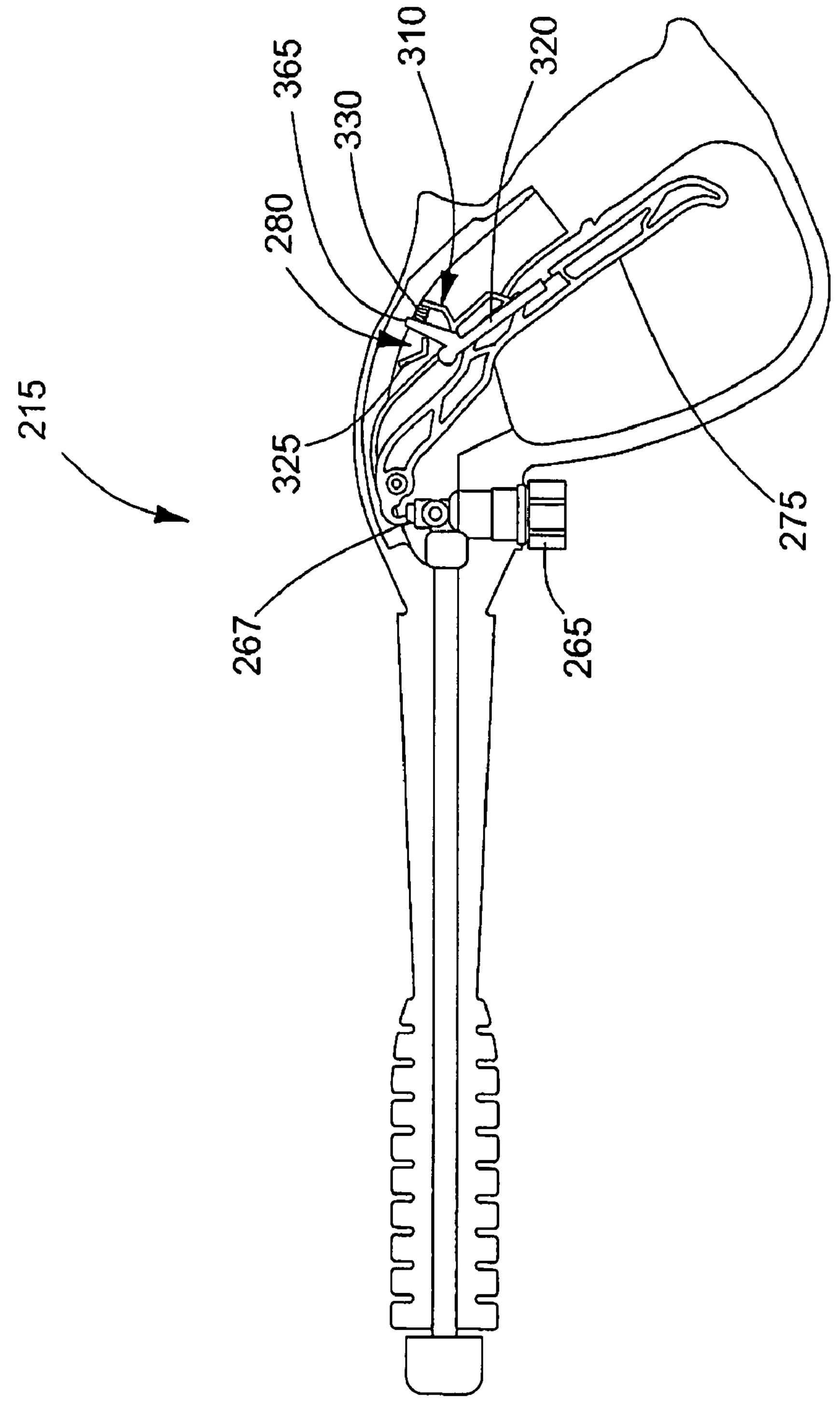
FIG. 9 is a section view of the gun of FIG. 6 taken along line 8-8 of FIG. 6 including a trigger assembly in an unlocked position.
Figure 10:
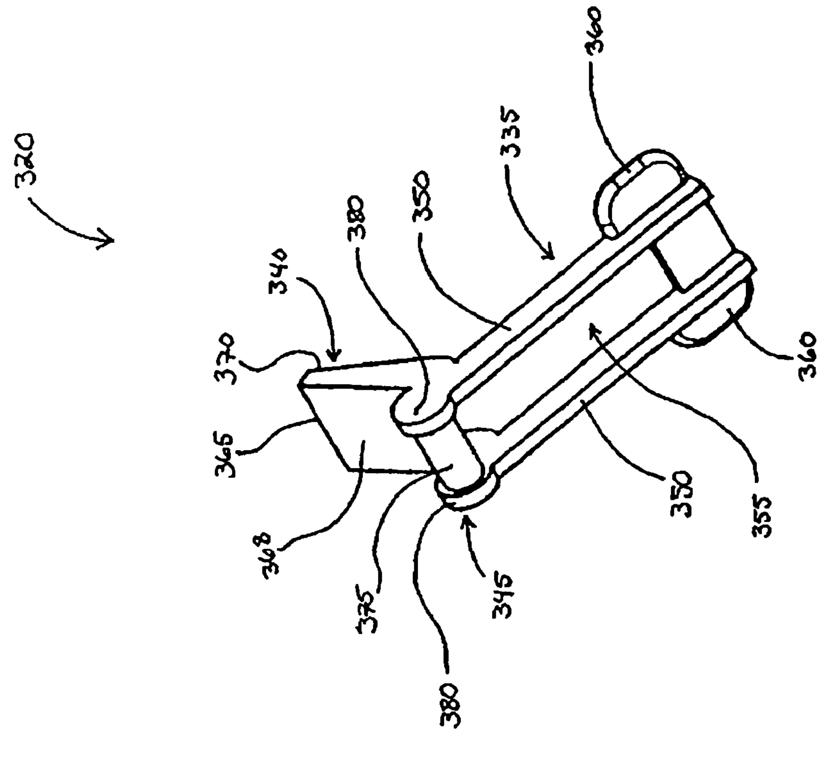
FIG. 10 is a perspective view of a lever of the trigger assembly of FIG. 8 and FIG. 9.
Figure 13:
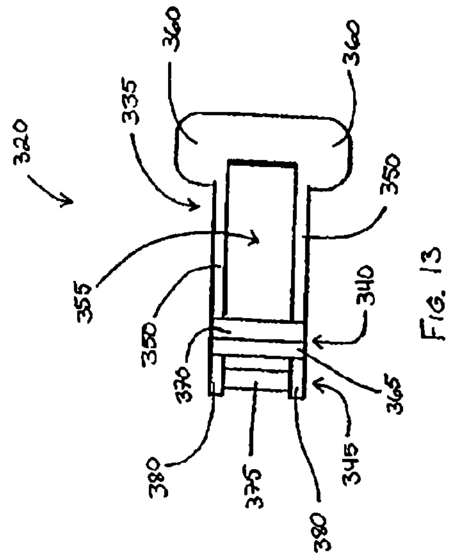
FIG. 13 is a top view of the lever of FIG. 10.
Figure 12:
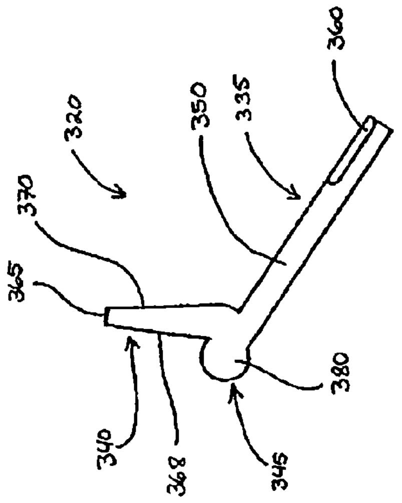
FIG. 12 is a side view of the lever of FIG. 10.
Figure 11:
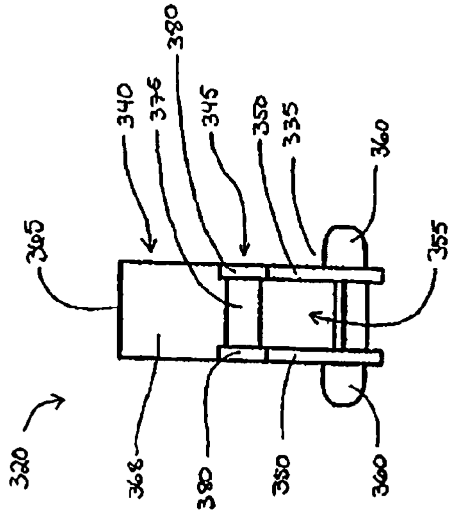
FIG. 11 is a rear view of the lever of FIG. 10.

As illustrated in FIGS. 8-9, the trigger lock assembly 280 also includes a lever 320, a bar 325, and a biasing member 330. FIG. 8 shows the trigger lock assembly 280 in a locked position while FIG. 9 shows the trigger lock assembly 280 in an unlocked position.

With reference to FIGS. 10-13, the lever 320 is a substantially "L"-shaped component that includes a push arm portion 335, a lock arm portion 340, and a connector portion 345. The push arm portion 335 includes two arms 350 that couple to the connector portion 345. The arms 350 are spaced apart from one another to define a space 355 and are arranged to provide the required stiffness to the lever 320. Engagement portions 360 extend from the arms 350 at an end of the push arm portion 335 opposite the connector portion 345.

Continuing to reference FIGS. 10-13, the lock arm portion 340 extends from the connector portion 345 and includes a stop surface 365, a bar surface 368, and a bias surface 370. The connector portion 345 includes a cylindrical central member 375 and two ears 380. The central member 375 fits within the aperture 305 to allow pivotal movement of the lever 320 with respect to the trigger 275. The ears 380 are larger than the central member 375 and the aperture 305 and inhibit the connector portion 345 from sliding laterally within the aperture 305.

The remaining components of the trigger lock assembly 280 are detailed in FIGS. 8-9. The bar 325 couples to or is formed as part of the body 250 and is positioned substantially above the trigger 275 and adjacent the lever 320. One end 385 of the bar 325 (see FIG. 8) contacts the lever 320. A first end of the biasing member 330 fits over the knob 315, and a second end of the biasing member 330 contacts the bias surface 370. Although a compression spring is depicted as the biasing member 320, other biasing members (e.g., torsional spring, leaf spring, and the like) are possible.

To operate the gun 215 of FIGS. 6-13, the user starts the engine 20 to begin operation of the pump 25 as described with regard to FIGS. 1-5. The user grasps the gun 215 and aims it at the surface to be cleaned. The trigger 275 is biased to the non-actuated position using biasing mechanisms that are well known in the art. The user pulls the trigger 275 toward the body 250 to open the valve 267 and to initiate the flow of high-pressure fluid out of the nozzle. However, the biasing member 330 biases the trigger lock assembly 280 in the locked position and inhibits the trigger 275 from moving a sufficient distance to open the valve 267. Specifically, biasing member 330 contacts the bias surface 370 to bias the lever 320 into a position in which the stop surface 365 contacts the bar 325. When the trigger lock assembly 280 is in the locked position, the end 385 contacts the stop surface 365. The bar 325 inhibits the trigger lock assembly 280 from moving to the unlocked position without movement of the lever 320. Thus, the user is unable to open the valve 267 without first moving the trigger lock assembly 280 to the unlocked position.

To move the trigger 275, the user must first operate the trigger lock assembly 280. More specifically, the user must move and maintain the lever 320 in the unlocked position by depressing at least one of the engagement portions 360 toward the trigger 275. This disengages the stop surface 365 from the bar 325 and allows the trigger 275 to be pulled toward the body 250. Once the trigger 275 is pulled to the actuated position against the body 250, the body 250 and the bar 325 maintain the trigger lock assembly 280 in the unlocked position until the user releases the trigger 275. In the unlocked position, the end 385 contacts the bar surface 368. The space 355 between the arms 350 receives the raised portion 278 of the trigger 275 and the lever recess 285 in the trigger 275 receives the push arm portion 335. When the user releases the trigger 275, the trigger assembly 260 returns to the non-actuated position and the biasing member 330 biases the trigger lock assembly 280 back to the locked position. This embodiment allows a user to actuate the trigger 275 with a left hand while simultaneously moving the trigger lock assembly 280 with a right hand. Alternatively, the user can switch hands to actuate the trigger with the right hand and the trigger lock assembly 280 with the left hand. The process reduces the likelihood that pressurized fluid will be inadvertently output from the pressure washer 10.

Figure 14:
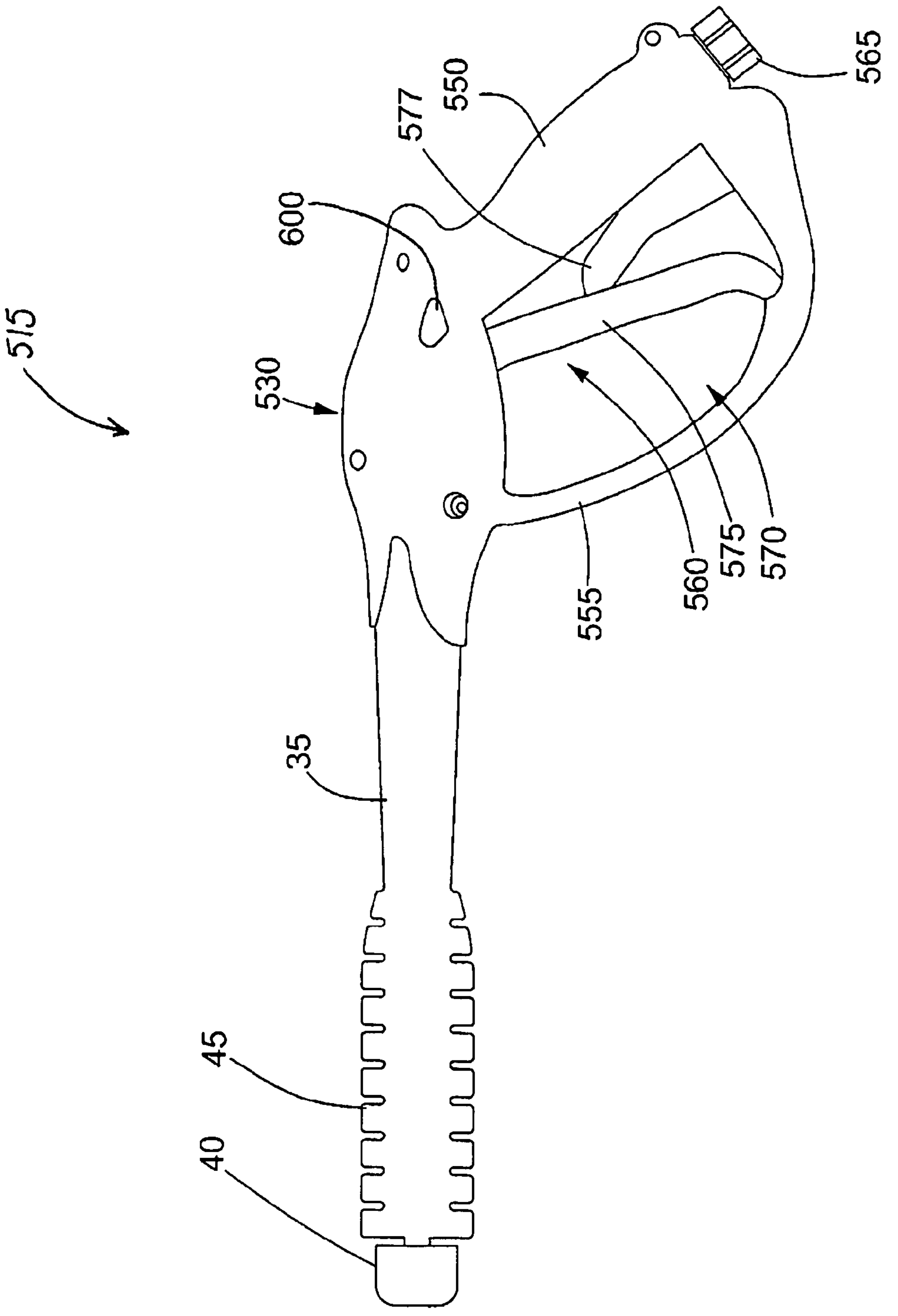
FIG. 14 is a side view of another embodiment of a gun.

FIGS. 14-22 illustrate another construction of a gun 515 for a pressure washer wand 10. FIG. 14 shows the gun 515 including a handle portion 530. The handle portion 530 is similar to the handle portion 230 and includes a body 550, a guard 555, and a trigger assembly 560. The body 550 includes a fluid inlet 565 and a flow path interconnected with the trigger assembly 560. The flow path includes a valve 567 (see FIG. 15) similar to the valve 267 described with regard to FIGS. 6-13. The guard 555 is similar to the guard 55 described with regard to FIGS. 1-5 and defines a trigger space 570. Unlike the guard of FIG. 6, the guard 555 defines a recess 557 (see FIGS. 15 and 17) positioned to engage the trigger assembly when in the non-actuated position to inhibit further movement of the trigger toward the guard. The trigger assembly 560 is substantially disposed within the trigger space 570.

Figure 15:
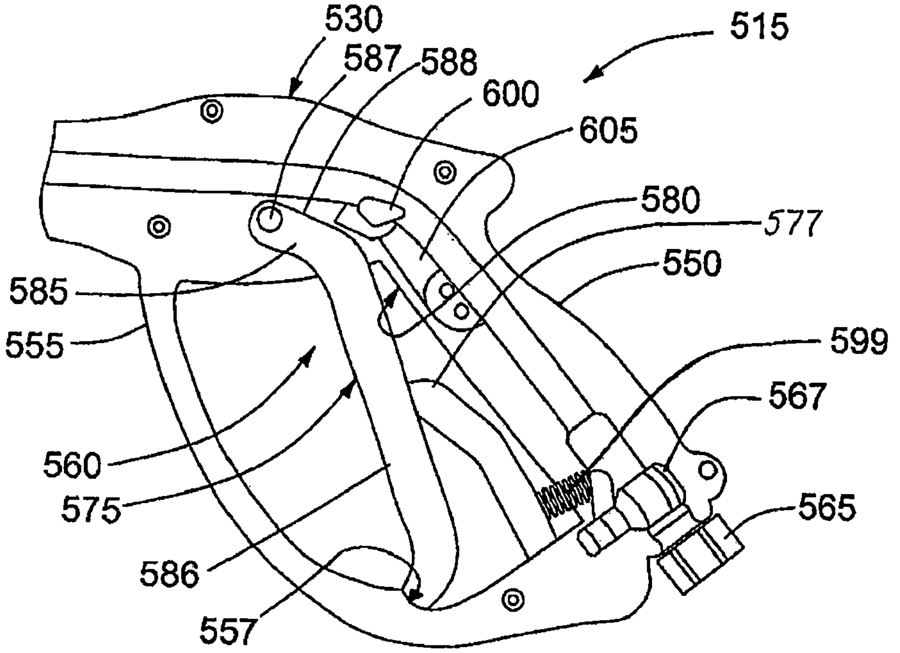
FIG. 15 is a side view of the gun of FIG. 14 with a portion removed to show a trigger assembly, a trigger lock assembly, a body, and a handle portion.

FIG. 15 illustrates the trigger assembly 560 which includes a trigger 575 (shown in FIG. 20) that extends from the body 550, a trigger arm 577, and a trigger lock assembly 580 coupled to the trigger 575. The trigger 575, shown in greater detail in FIGS. 20-21, includes a bent end 585 that couples to the body 550 and a grip end 586. The bent end 585 includes two cylindrical portions 587 that pivotally attach to the body 550 and lock engaging portions 588 that define a channel 589 adjacent the trigger lock assembly 580.

The grip end 586 includes a recess 590 that extends from a first surface 591 of the trigger 575 to a second surface 592. A planar surface 593 on the side of the trigger 575 opposite the first surface 591 includes a substantially rectangular hole 594 having a smaller cross-section than the recess 590 and extending from the planar surface 593 through the second surface 592. The grip end 586 of the trigger 575 allows the user to grip and pivotally move the trigger between an actuated and a non-actuated position.

Figure 19:
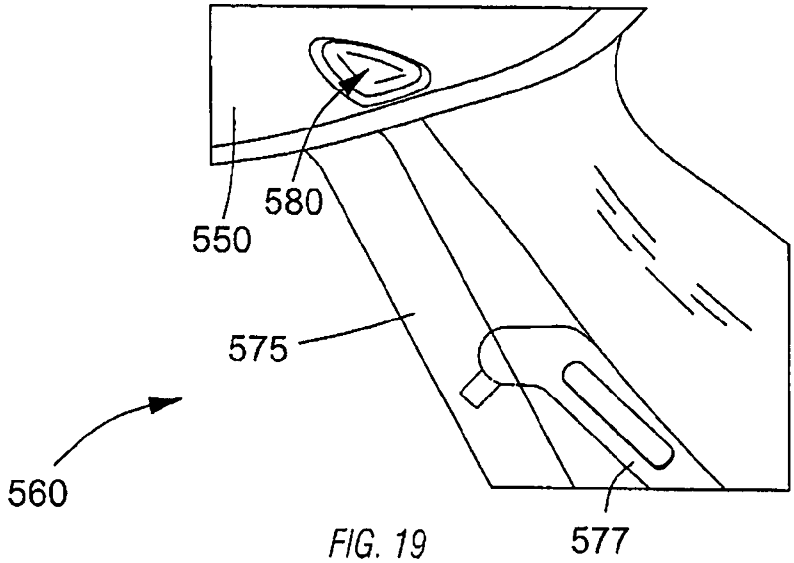
FIG. 19 is a side view of a portion of the gun of FIG. 14 including a portion of the trigger assembly.
Figure 20:
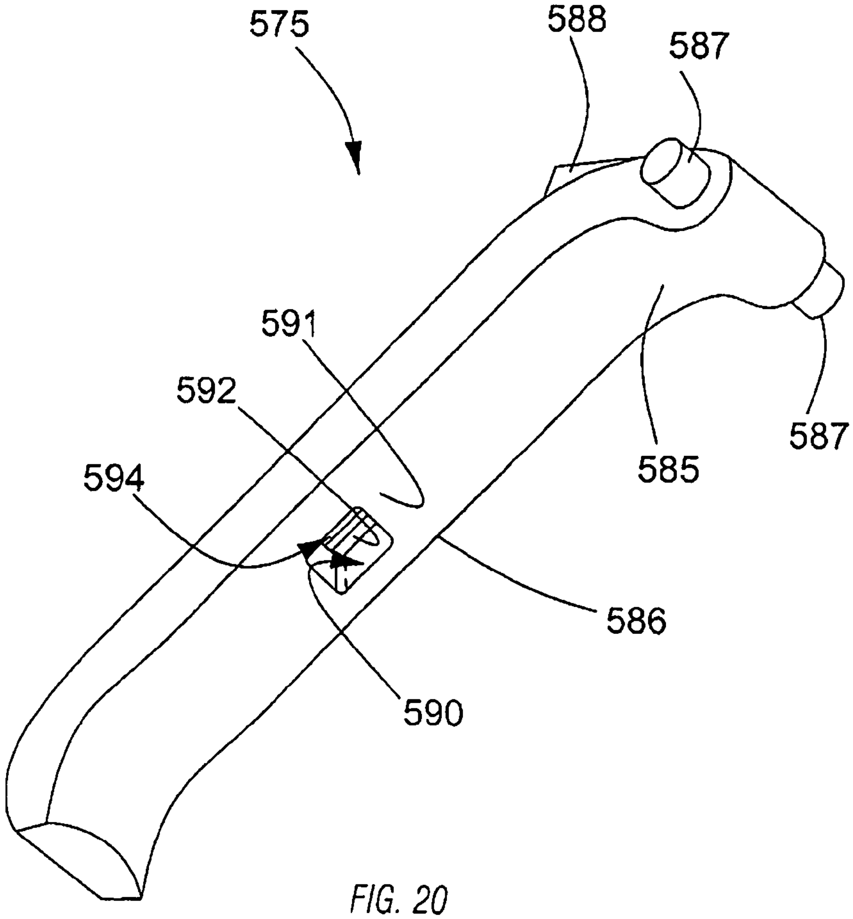
FIG. 20 is a perspective view of the trigger of FIGS. 15 and 19.
Figure 21:
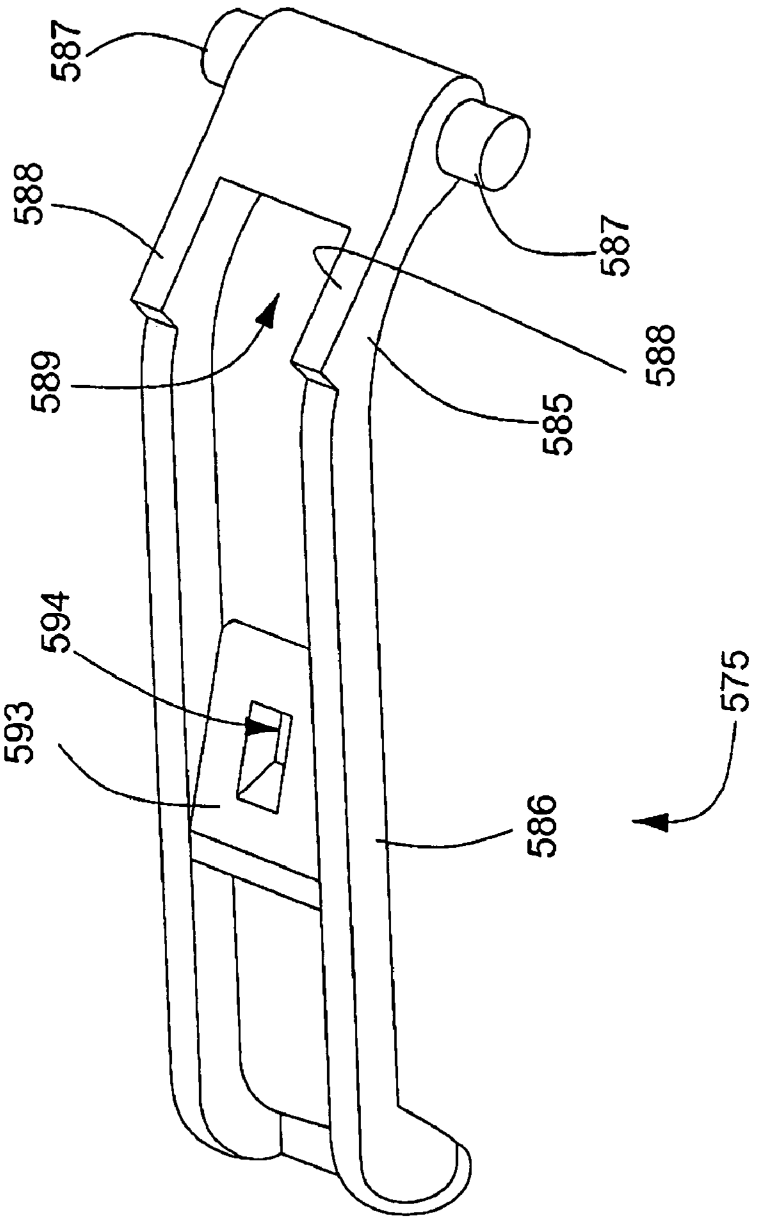
FIG. 21 is another perspective view of the trigger of FIGS. 15 and 19.
Figure 22:
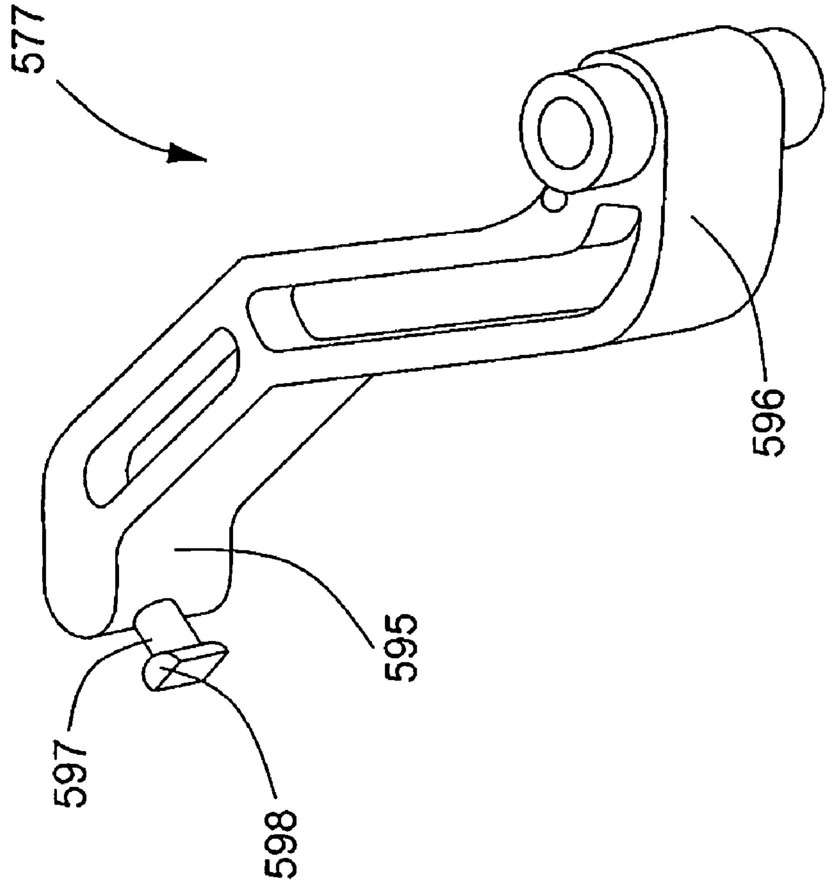
FIG. 22 is a perspective view of the trigger arm of FIGS. 15 and 19.

FIG. 22 shows the trigger arm 577, which extends between the trigger 575 and the body 550, as including a first end 595 and a second end 596. The first end 595 includes an extension 597 extending away from the first end 595. The extension 597 includes ends 598 protruding on both sides of the extension 597. The extension 597 pivotally couples to the trigger 575 through the hole 594 and within the recess 590, as shown in FIG. 19. The second end 596 pivotally engages the body 550. Generally, the trigger 575 and the trigger arm 577 are biased to a non-actuated position using a biasing mechanism, such as a compression spring 599 (shown in FIG. 15).

Figure 16:
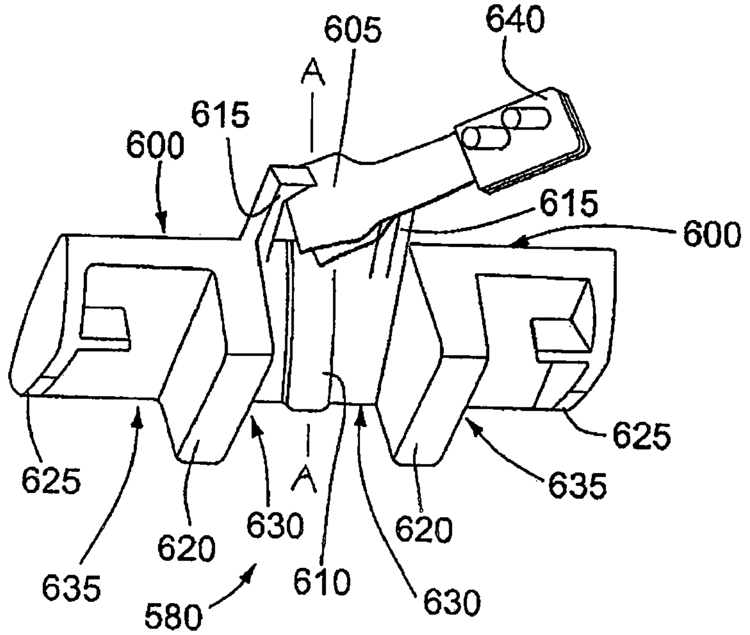
FIG. 16 is a perspective view of the trigger lock assembly of FIG. 15.

FIGS. 15-16 illustrate one construction of the trigger lock assembly 580 including a lock member 600 and a biasing member 605. In this construction, the trigger lock assembly 580 is shown aft of the trigger 575. The lock member 600 includes a central portion 610, two bias arms 615, two extended portions 620, and two actuation surfaces 625. Before proceeding, it should be noted that FIG. 16 illustrates only a portion of the lock member 600 and that only one of the bias arms 615, the extended portions 620, and the actuation surfaces 625 are shown. Nonvisible bias arm 615, extended portion 620, and push arm 625 in FIG. 16 generally mirror the respective visible components disposed opposite line A-A. The bias arms 615 extend from both sides of the central portion 610, such that at least a portion of the bias arms 615 are in contact with the biasing member 605. The extended portions 620 project substantially below the remaining portion of the lock member 600. The central portion 610 and the extended portions 620 define a central recess 630 of the lock member 600. The extended portions 620 and the actuation surfaces 625 define lateral recesses 635 of the lock member 600.

Continuing to reference FIGS. 15-16, the biasing member 605 includes one end that contacts the lock member 600 and a second end connected to the body 550 using a body connector 640. The body connector 640 fastens the biasing member 605 to the body 550. The biasing member 605 shown is a leaf spring, but other biasing members are possible.

Figure 17:
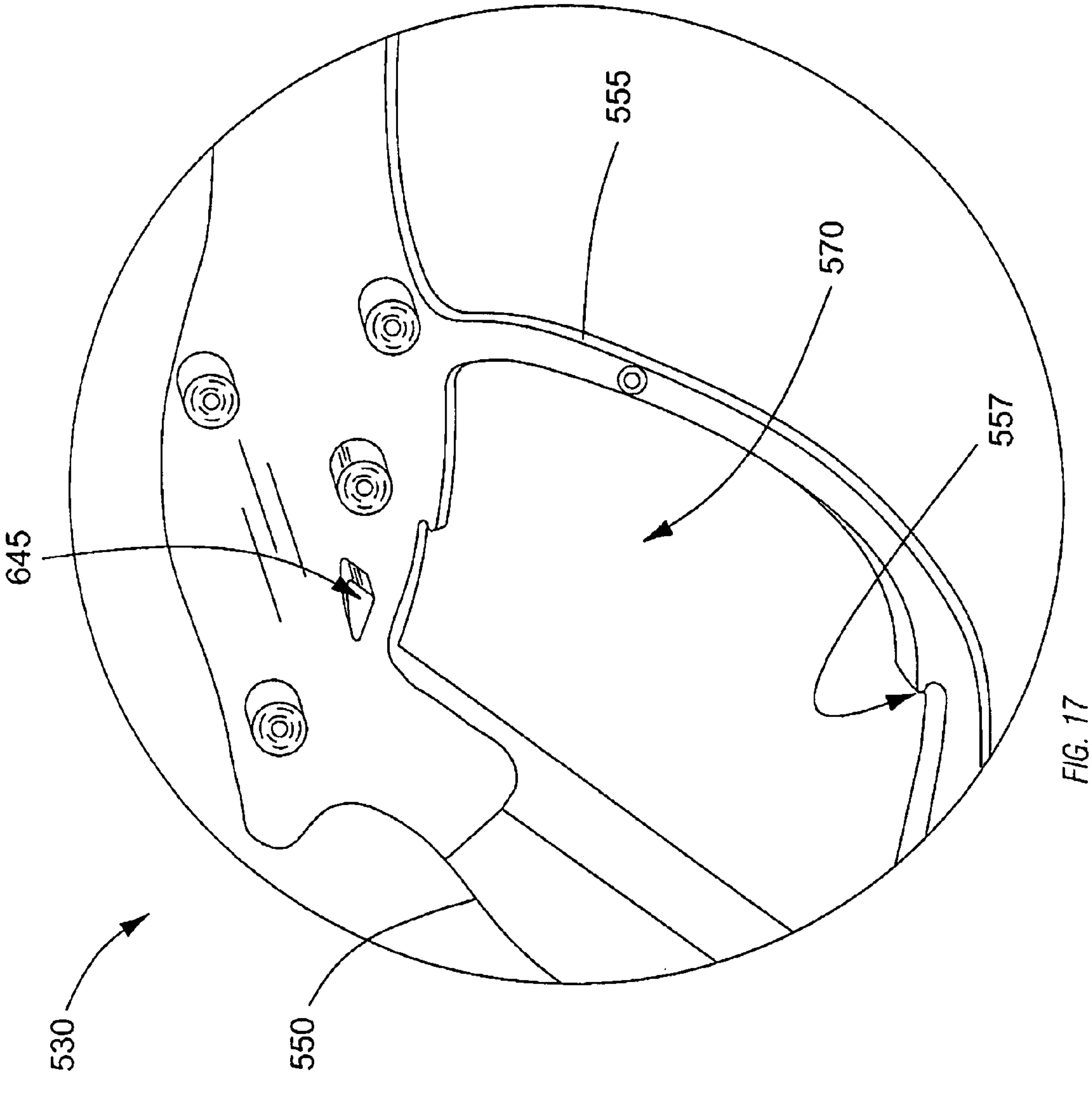
FIG. 17 is a side view of a portion of the handle portion of the gun of FIG. 14.
Figure 18:
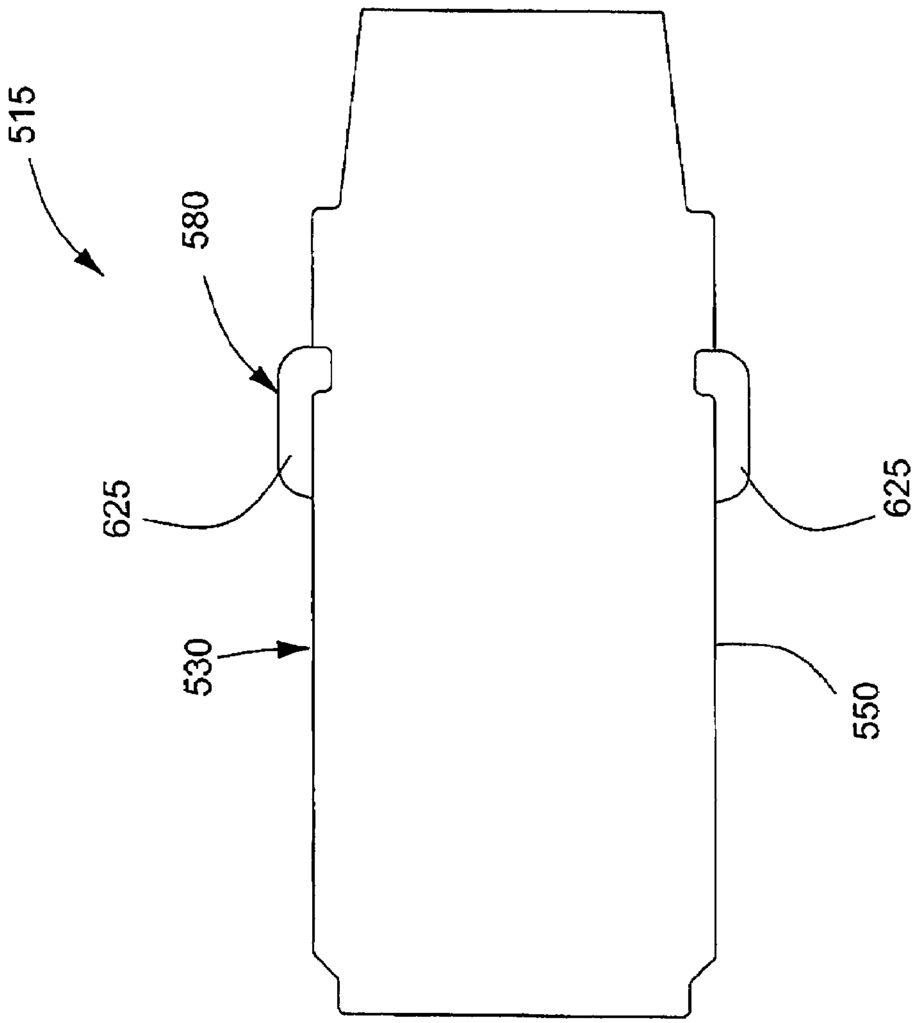
FIG. 18 is a top view of a portion of the gun of FIG. 14, including the trigger lock assembly with actuation surfaces on both sides of the handle portion.

FIGS. 17-18 illustrate the relationship between the lock member 600 and the body 550. Specifically, FIG. 17 shows one half of the handle portion 530 of the gun 515 including an opening 645 in the body 550. The opening 645 is shaped to substantially match the shape of the actuation surfaces 625. Both halves of the gun 515 include the opening 645, but only one half has been shown in FIG. 17. FIG. 18 shows the actuation surfaces 625 protruding through both openings 645 and extending beyond the body 550 on either side.

To operate the gun of FIGS. 14-22, the user starts the engine 20 to begin operation of the pump 25 as before. The pump 25 draws low-pressure fluid from the source, increases the pressure of the fluid, and delivers the fluid to the passageway. The user grasps the gun 515 and aims it at the surface to be cleaned. The user must pull the trigger 575 toward the body 550 to open the valve 567 and initiate the flow of high-pressure fluid out of the nozzle. However, the trigger lock assembly 580 is biased in the locked position and the extended portions 620 engage the lock engaging portion 588 of the bent end 585 to inhibit the trigger 575 from moving a sufficient distance to open the valve 567. Thus, the user is unable to open the valve 567 without first moving the trigger lock assembly 580 to the unlocked position. To unlock the trigger lock assembly 580, the user must move and maintain the lock member 600 in the unlocked position by depressing one of the actuation surfaces 625 while moving the trigger 575, thereby disengaging the lock engaging portion 588 from the extended portions 620. The bent end 585 is then permitted to travel within the central recess 630 and the lateral recesses 635. In the actuated position, the extended portions 620 protrude into the channel 589, thereby inhibiting the trigger lock assembly 580 from moving to the locked position while the trigger 575 is held in the actuated position. Thus, the user is able to release the push arm 625 without the lock assembly 580 moving back to the locked configuration. When the user releases the trigger 575, the trigger assembly 560 returns to the non-actuated position. The biasing member 605 then biases the trigger lock assembly 580 to the locked position as before. The trigger lock assembly 580 may be unlocked using either push arm 625. This allows a user to actuate the trigger 575 with a left hand while simultaneously moving the trigger lock assembly 580 with a right hand by moving the lock member 600 to the left. Alternatively, the user can switch hands to actuate the trigger 575 with the right hand and the trigger lock assembly 580 with the left hand by moving the lock member 600 to the right. The process reduces the likelihood that a user will activate the pressure washer 10.

Figure 23:
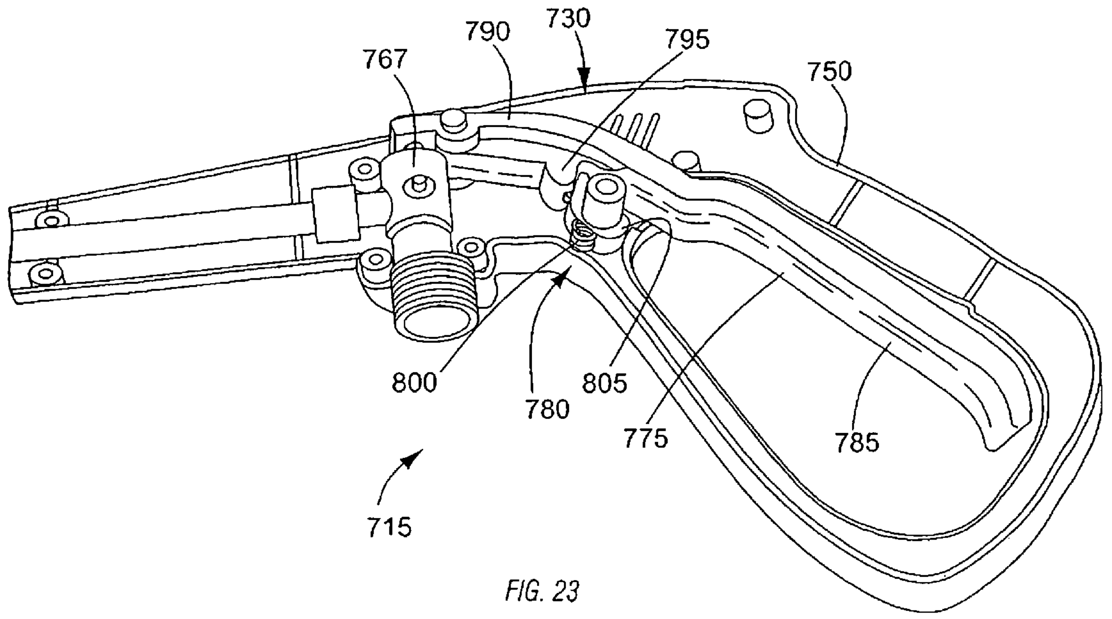
FIG. 23 is a perspective view of another trigger and trigger lock assembly for a gun.
Figure 24:
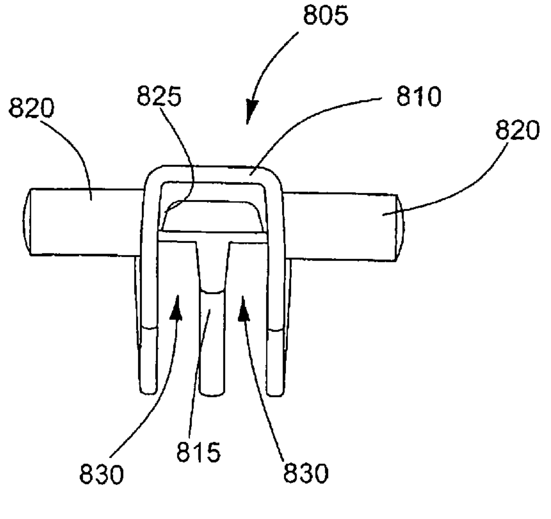
FIG. 24 is a front view of a portion of the trigger lock assembly of FIG. 23.

FIGS. 23-24 show another construction of a gun 715 including a handle portion 730, a body 750, a valve 767, a trigger 775, and a trigger lock assembly 780 positioned forward of the trigger 775. The handle portion 730, the body 750, the valve 767, and other components of the gun 715 illustrated in FIG. 23 are similar to the components of the guns 15, 215, and 515. These components will not be discussed in further detail. The trigger 775 includes a grip end 785 facilitating movement of the trigger 775 between an actuated and a non-actuated position and a bent end 790 pivotally attached to the body 750. Unlike the trigger 575 in FIGS. 14-22, the trigger 775 includes a single stop member 795 extending from the bent end 790 adjacent the trigger lock assembly 780.

The trigger lock assembly 780 shown in FIG. 23 includes a biasing member 800 and a lock member 805. In the illustrated construction, the biasing member 800 includes a compression spring, but other biasing members are possible. The lock member 805 includes a central portion 810, at least one extended portion 815, and two actuation surfaces 820. The central portion 810 includes a channel 825 that at least partially supports the biasing member 800. The extended portion 815 protrudes from the central portion 810 and defines recesses 830 in the lock member 805. The actuation surfaces 820 laterally extend from both sides of the central portion 810 and protrude through the body 750, similar to the actuation surfaces 625 described previously in FIGS. 14-22.

Operation of the gun 715 shown in FIGS. 23-24 is similar to the operation of the gun 515 discussed with regard to FIGS. 14-22. Actuation of the gun 715 is achieved by a user pulling the trigger 775 toward the body 750 to open the valve 767 and initiate the flow of fluid out of the nozzle. However, the trigger lock assembly 780 is biased in the locked position and the extended portion 815 engages the stop member 795 of the bent end 790 to inhibit the trigger 775 from moving a sufficient distance to open the valve 767. Again, the user is unable to open the valve 767 without first moving the trigger lock assembly 780 to the unlocked position. The user moves and maintains the lock member 805 in the unlocked position by depressing the actuation surfaces 820, thereby disengaging the stop member 795 from the extended portion 815. The bent end 790 is then permitted to travel within one of the recesses 830 and toward the actuated position. Once the trigger 775 is moved to the actuated position, the trigger lock assembly 780 is maintained in the unlocked position, thereby allowing the user to release the lock member 805 without the trigger lock assembly 780 moving to the locked position. When the user releases the trigger 775, the trigger 775 returns to the non-actuated position. The biasing member 800 then biases the trigger lock assembly 780 to the locked position as before. Similar to the operation described above with regard to the gun 515, a user may unlock the trigger lock assembly 780 and actuate the trigger 775 using either push arm 820, thereby allowing for convenient operation using either a left or right hand. The process reduces the likelihood that a user will inadvertently activate the pressure washer 10.

Thus, the invention provides, among other things, a new and useful wand for a pressure washer. The constructions of the wand and the methods of manufacturing the wand described herein and herein and illustrated in the figures are presented by way of example only and are not intended as a limitation upon the concepts and principles of the invention. Various features and advantages of the invention are set forth in the following claims.

What is claimed is:

1. A pressure washer wand connectable to a source of fluid, the pressure washer wand comprising:

a housing defining an interior;

a flow path within the interior and including an inlet in fluid communication with the source and an outlet;

a valve having a valve member in the flow path that is movable between a closed position and an open position in which fluid travels from the inlet to the outlet;

a user interface movable between an actuated position in which the valve is open and a non-actuated position in which the valve is closed;

a lock member substantially disposed within the interior and movable in a substantially linear manner between a locked position in which the lock member inhibits movement of the user interface to the actuated position and an unlocked position;

wherein the user interface includes a lock engaging portion that engages the lock member when in the locked position to inhibit movement of the user interface toward the actuated position; and wherein the lock engaging portion engages the lock member when the user interface is in the actuated position to maintain the lock member in the unlocked position.

2. The pressure washer wand of claim 1, wherein the housing defines a first side and a second side, and wherein the lock member is movable along a path that extends from the first side to the second side.

3. The pressure washer wand of claim 2, wherein the lock member is movable from the locked position toward the first side to the unlocked position, and is movable from the locked position toward the second side to a second unlocked position.

4. The pressure washer wand of claim 3, wherein the lock member includes a first actuation surface adjacent the second side and engageable by a user to move the lock member toward the first side, and a second actuation surface adjacent the first side and engageable by the user to move the lock member toward the second side.

5. The pressure washer wand of claim 1, further comprising a biasing member that biases the lock member toward the locked position.

6. The pressure washer wand of claim 1, wherein the lock member includes a central recess that defines a central plane, and wherein the lock member is symmetrical about the plane.

7. The pressure washer wand of claim 6, wherein at least a portion of the user interface passes through the central recess as the lock member moves to the unlocked position.

8. The pressure washer wand of claim 1, wherein the lock member includes a first extended portion and a second extended portion, and wherein at least one of the first extended portion and second extended portion inhibits movement of the user interface when the lock member is in the locked position.

9. A pressure washer wand connectable to a source of fluid, the pressure washer wand comprising:

a housing defining an interior;

a flow path within the interior and including an inlet in fluid communication with the source and an outlet;

a valve having a valve member in the flow path that is movable between a closed position and an open position in which fluid travels from the inlet to the outlet;

a user interface movable between an actuated position in which the valve is open and a non-actuated position in which the valve is closed;

a lock member movable in a first direction from a locked position to a first unlocked position and movable in a second direction opposite the first direction from the locked position to a second unlocked position, the lock member inhibiting movement of the user interface to the actuated position when in either of the first locked position and the second locked position;

wherein the user interface includes a lock engaging portion that engages the lock member when in the locked position to inhibit movement of the user interface toward the actuated position; and wherein the lock engaging portion engages the lock member when the user interface is in the actuated position to maintain the lock member in the unlocked position.

10. The pressure washer wand of claim 9, wherein the housing defines a first side and a second side and wherein the lock member is movable along a substantially linear path that extends from the first side to the second side.

11. The pressure washer wand of claim 10, wherein the lock member is movable from the locked position toward the first side to the unlocked position and is movable from the locked position toward the second side to a second unlocked position.

12. The pressure washer wand of claim 10, wherein the lock member includes a first actuation surface adjacent the second side and engageable by a user to move the lock member toward the first side, and a second actuation surface adjacent the first side and engageable by the user to move the lock member toward the second side.

13. The pressure washer wand of claim 9, further comprising a biasing member coupled to the lock member to bias the lock member toward the locked position.

14. The pressure washer wand of claim 9, wherein the lock member includes a central recess that defines a central plane, and wherein the lock member is symmetrical about the plane.

15. The pressure washer wand of claim 14, wherein at least a portion of the user interface passes through the central recess as the lock member moves to the unlocked position.

* * * * *